Figures 1, 11:
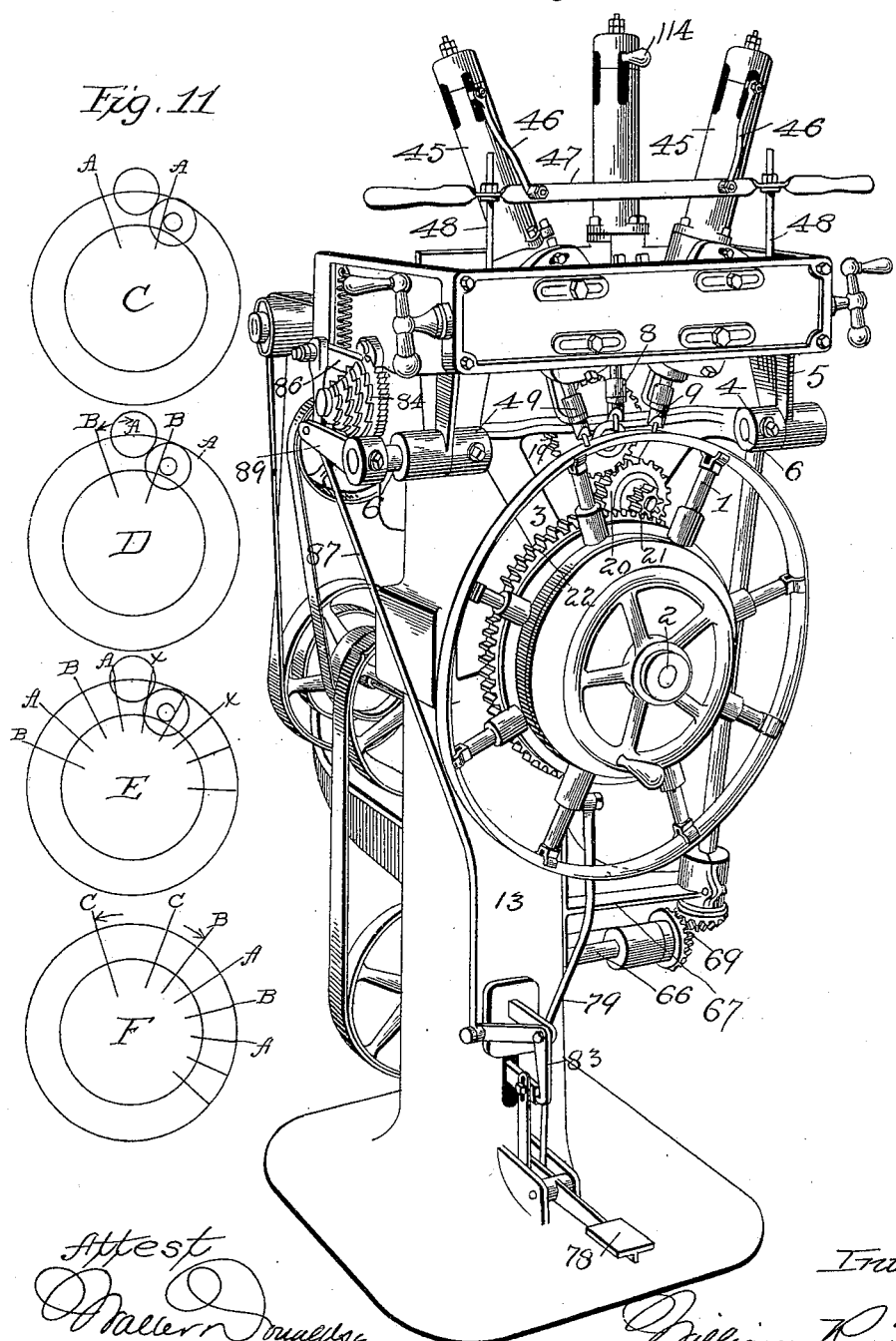

No. 614,378. Patented Nov. 15, 1898.
W. R. FOX.
AUTOMATIC RIM DRILLING MACHINE.
(Application filed Apr. 26, 1897. Renewed Apr. 26, 1898.)
(No Model.) 5 Sheets—Sheet 1.

Attest
Inventor
William R. Fox

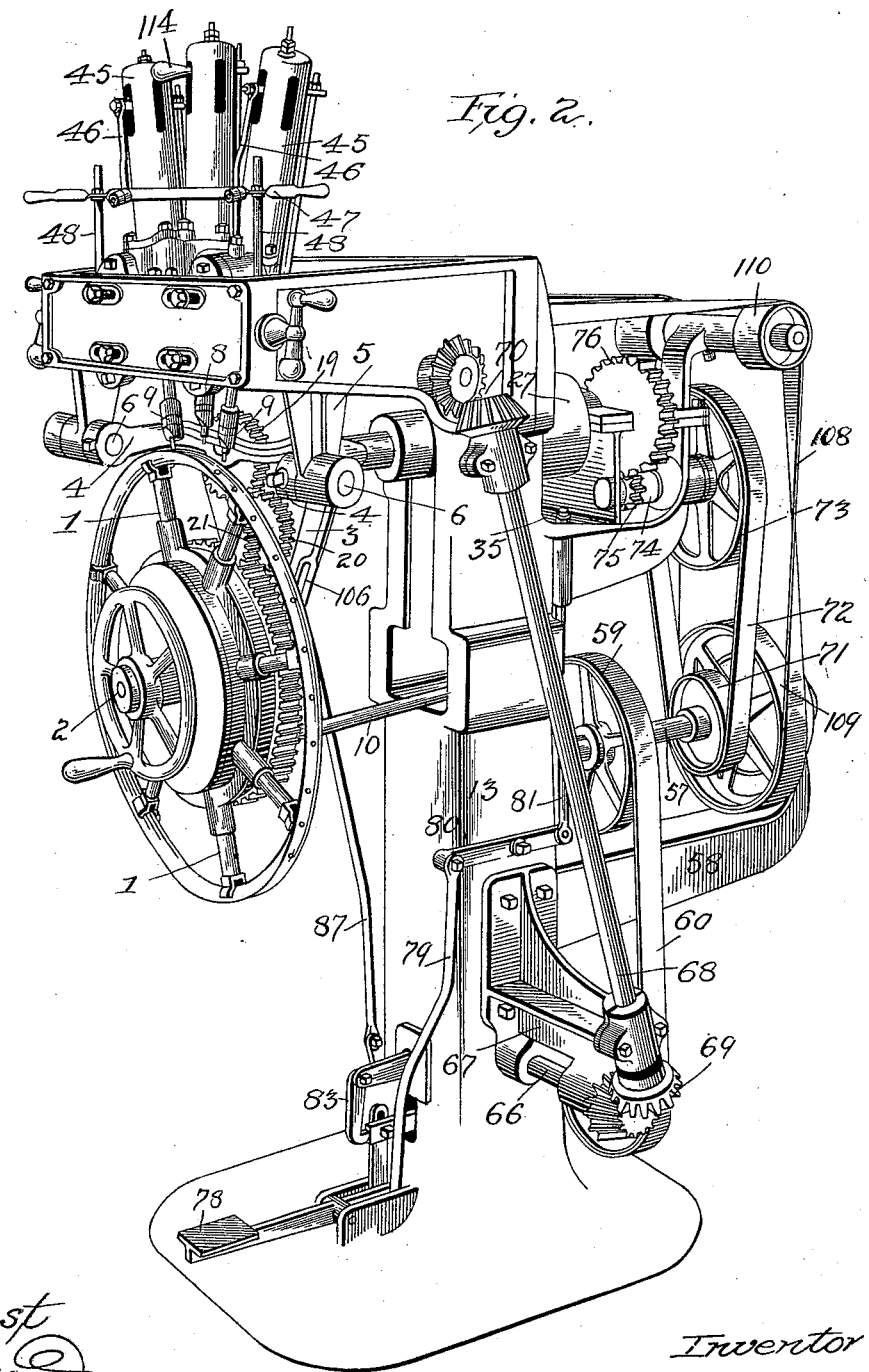

No. 614,378. Patented Nov. 15, 1898.
W. R. FOX.
AUTOMATIC RIM DRILLING MACHINE.
(Application filed Apr. 26, 1897. Renewed Apr. 26, 1898.)
(No Model.) 5 Sheets—Sheet 3.
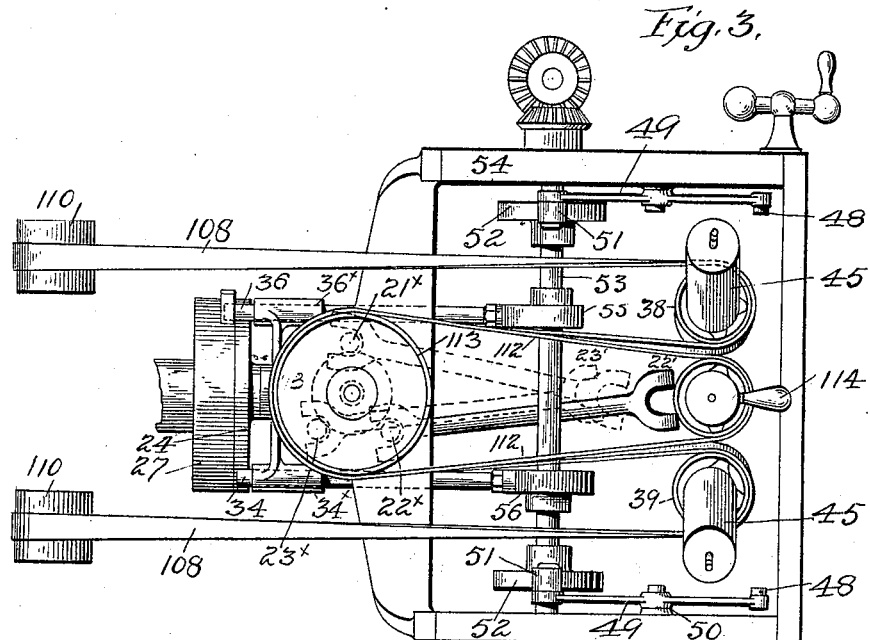
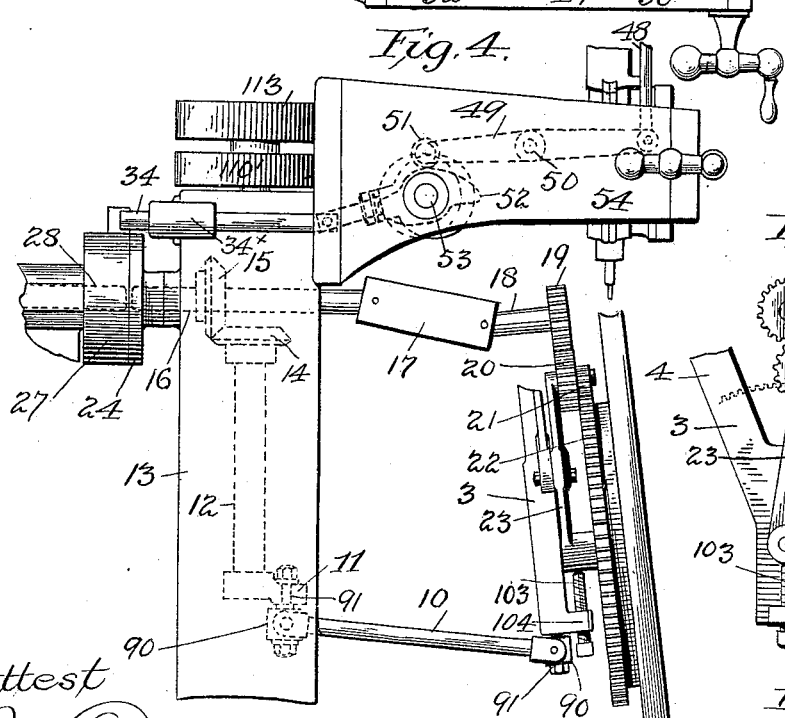
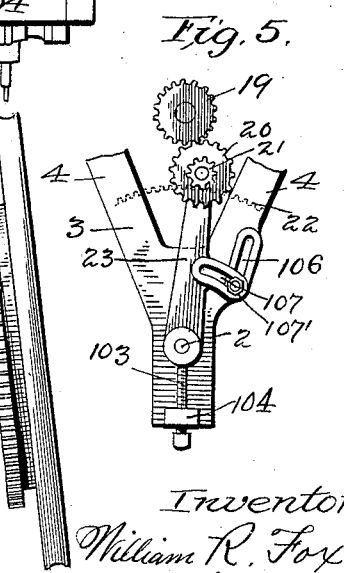
Attest
Walter Donaldson
F. L. Middleton
Inventor
William R. Fox
by Ellis Spear
Atty.

No. 614,378. Patented Nov. 15, 1898.
W. R. FOX.
AUTOMATIC RIM DRILLING MACHINE.
(Application filed Apr. 26, 1897. Renewed Apr. 26, 1898.)
(No Model.) 5 Sheets—Sheet 4.
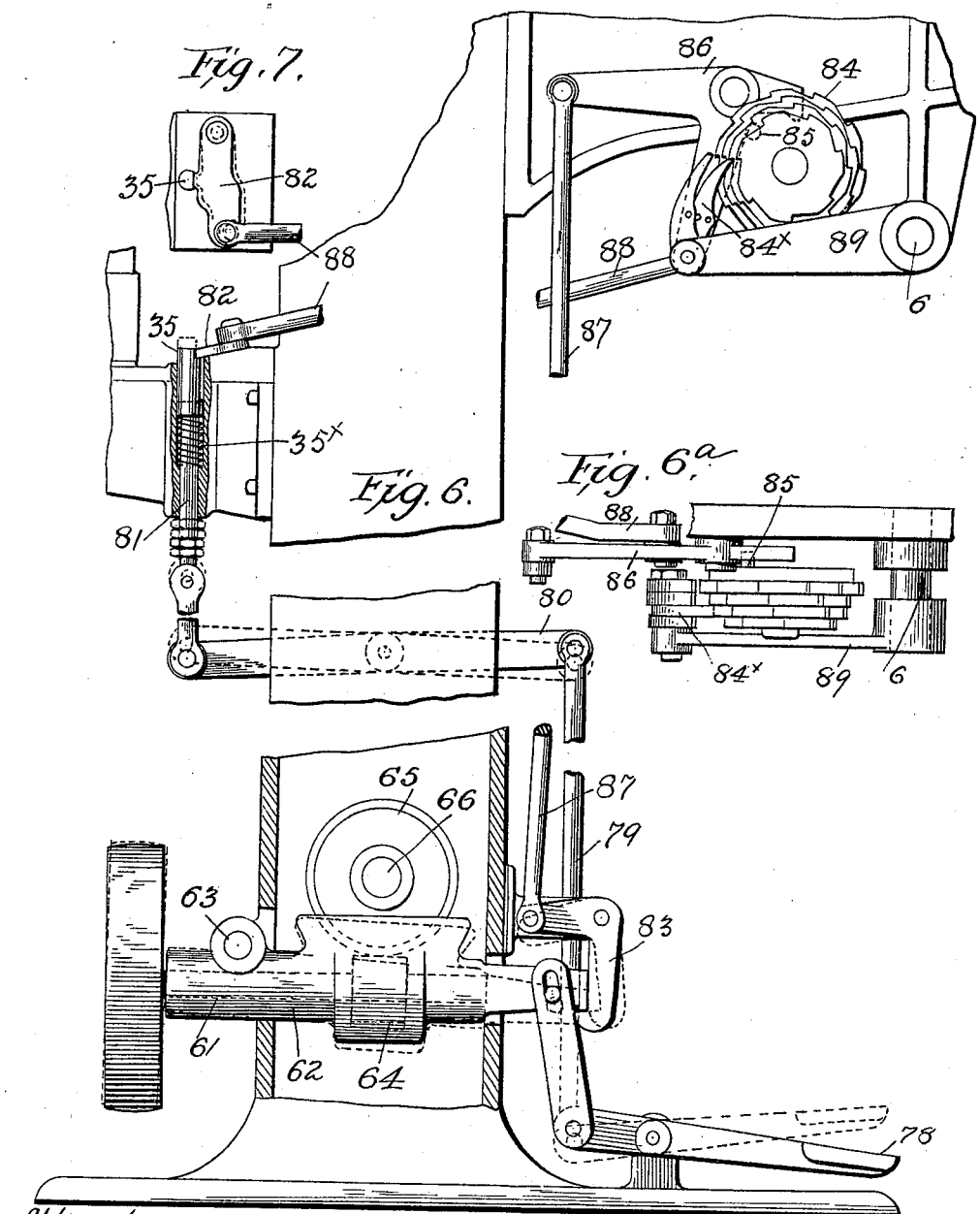

No. 614,378. Patented Nov. 15, 1898.
W. R. FOX.
AUTOMATIC RIM DRILLING MACHINE.
(Application filed Apr. 26, 1897. Renewed Apr. 26, 1898.)
(No Model.) 5 Sheets—Sheet 5.
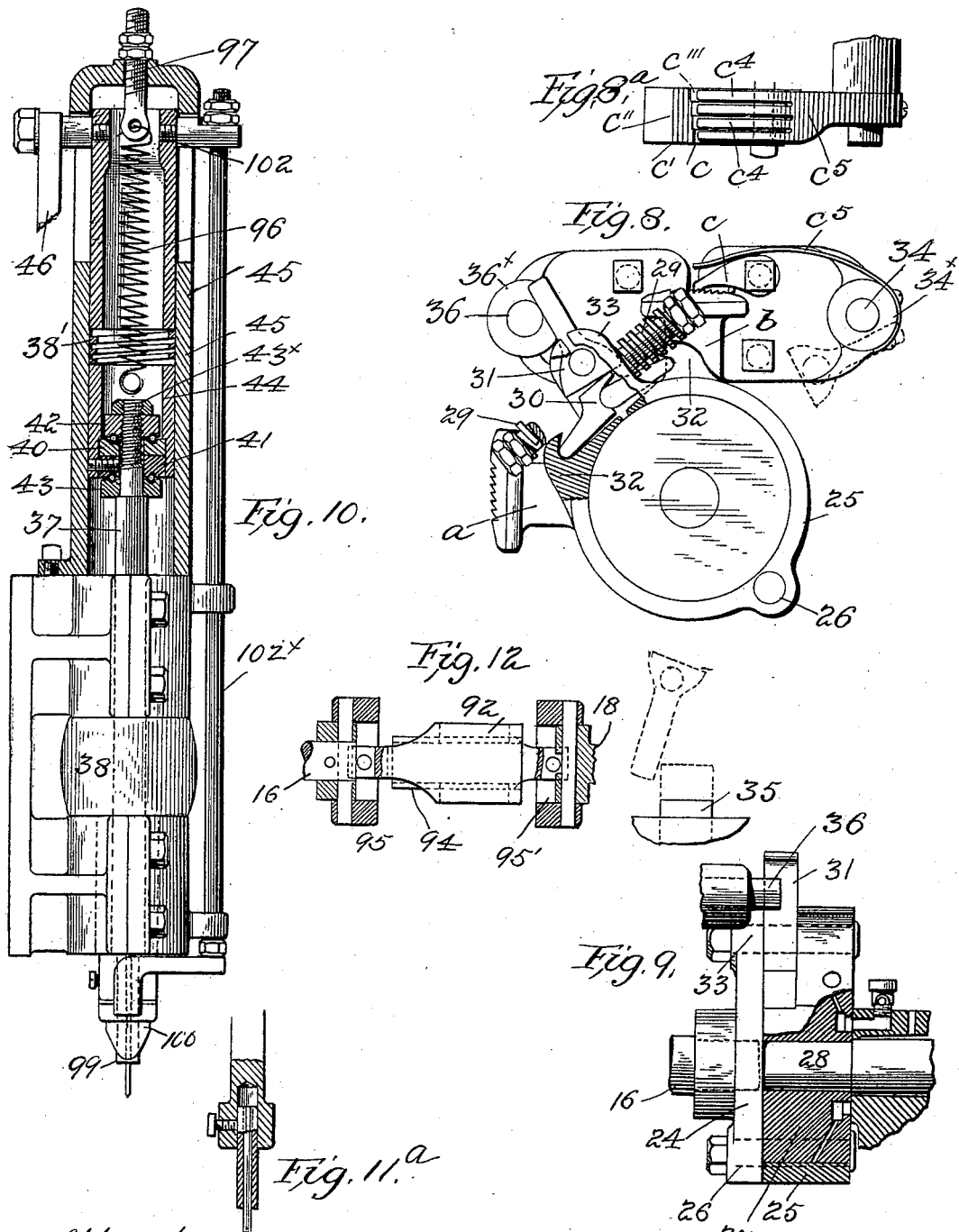

UNITED STATES PATENT OFFICE.

WILLIAM R. FOX, OF GRAND RAPIDS, MICHIGAN.

AUTOMATIC RIM-DRILLING MACHINE.

SPECIFICATION forming part of Letters Patent No. 614,378, dated November 15, 1898.

Application filed April 26, 1897. Renewed April 26, 1898. Serial No. 678,912. (No model.)

*To all whom it may concern:*

Be it known that I, WILLIAM R. FOX, a citizen of the United States, residing at Grand Rapids, in the county of Kent and State of Michigan, have invented certain new and useful Improvements in Automatic Rim-Drilling Machines, of which the following is a specification, reference being had therein to the accompanying drawings.

It is the object of my invention to provide a machine for drilling bicycle or like rims in which the movements of the chuck for holding the rims will be automatic as well as the movements of the drill, and my machine includes an oscillating chuck adapted to give the proper inclination to the rims, with means for oscillating said chuck automatically and for partially rotating it between the drilling actions, the automatic driving mechanism being so timed that the movements of the chuck and drills alternate.

My invention is illustrated in the accompanying drawings, of which—

Figure 1 is a front perspective view of the machine; Fig. 2, a perspective view from the side; Fig. 3, a detail plan view of drilling mechanism and the chuck-controlling clutch. Fig. 4 is a detail side view of the same, showing also the operating connections to the chuck. Fig. 5 is a detail front view of part of the pendulum. Fig. 6 is a detail side view of the stop-motion and detachable gearing. Fig. 6ª is a detail view relating to the same. Fig. 7 is a detail of a catch-plate for the stop-pin of Fig. 6. Fig. 8 is a detail end view of the clutch for controlling the oscillation and rotation of the pendulum. Fig. 8ª is a detail view of part of Fig. 8. Fig. 9 is a side view of the same; Fig. 10, a detail view of the drill-standard with the drill therein, and Fig. 11 shows diagrams illustrating the manner of drilling the holes in the rim. Fig. 11ª is a detail view of the drill and a part of its spindle. Fig. 12 is a detail view of a shaft-coupling.

The rim to be drilled is held by a chuck 1 of any suitable construction—such, for instance, as is shown in my United States Patent No. 564,479, dated July 21, 1896, the shaft 2 of the chuck being carried by a hanger or pendulum 3, the upper forked part of which has its arms 4 pivoted to the hangers 5 of the frame by the horizontal spindles 6. The drills in the present case are three in number, a central drill 8 being adapted to drill the valve-hole when lowered by hand and the two drills 9 being operated from the automatic connections to drill the spoke-holes, for which automatic action the rim is rotated step by step and oscillated into its two inclined positions. The inclination of the chuck with the rim is intended to permit the drills to make the spoke-holes axially in line with the ends of the hub, the chuck inclining first forward and then backward, so that the holes will alternate as to inclination, one inclining to the front end of the hub, while the next hole will incline to the rear or inner end of the hub. For giving the chuck these inclined positions automatically a pitman 10 is connected by a swiveled joint to the lower end of the pendulum and at its other end by a second swiveled joint to a crank 11 on a vertical shaft 12, arranged within the standard 13 of the machine, said shaft being operated through the beveled gears 14 15 from a shaft 16, extending from front to rear of the machine. This shaft 16 also serves to effect the step-by-step rotary movement of the chuck to bring different parts of the rim to the drills, and for this purpose it is connected, through the universal joint 17 and shaft-section 18, with the gear 19, which, through the gear 20 and pinion 21, imparts movement to the gear 22, connected with the chuck, the said gear 20, with its pinion 21, being carried by an arm 23 on the chuck-shaft.

The oscillations and rotary movements of the chuck are intermittent and occur between the drilling actions—that is, while the drills are receding from and while they are returning to their work. At the moment the drilling is to commence the chuck, with the rim, has completed its movement, both as to inclination and rotation, and remains stationary while the drilling is being performed. For this intermittent action of the chuck the shaft 16 is driven by a clutch controlled by cams from the same cam-shaft which controls the rising and falling movements of the drills. On the shaft 16 a disk 24 is fixed, carrying a split friction-ring 25, by means of a bolt 26. This friction-ring surrounds a friction-disk 27, fixed on a constantly-rotating shaft 28.

The ring is under tension of spring 29, tending constantly to clamp the ring to the disk, so as to move therewith, and thus drive the chuck-controlling shaft 16; but when the toggle-arms 30 are pressed upon by the clutch-controlling lever 31 said arms, pressing outwardly against the studs 32 of the clamping-ring, will free the friction-ring from contact with the rotary disk. The clutch-lever 31 is pivoted to the ear 33 of the disk 24 of the chuck-controlling shaft 16, and it has an enlarged end for engaging the toggle-arms. When the lever is turned on its pivot by striking either one of three pins 34, 35, or 36, the friction-ring will be released and the chuck will remain stationary both as to inclination and as to rotation. The pin 35 forms the stop-pin, and when the clutch-lever 31 strikes this the movements of the chuck are arrested, the rim having been completely drilled, and the chuck will then remain stationary until the operator places a fresh rim and withdraws this stop-pin, when the rotary step-by-step and the oscillating movements will take place in order between the drilling actions, the stop-pin being retained in its backward position until released by pattern mechanism, hereinafter described, which determines the number of holes which will be drilled in a rim, thus adapting the machine for drilling rims of different diameters.

The drills are carried by spindles 37, driven through pulleys 38 39, as hereinafter described, said spindles having disks 42 43 turning therewith, with antifriction-balls between them and the hardened-steel disks 40 41, fixed to the sleeves 44. The disks 42 43 and the drill-spindle are adjusted by the nut $43^\times$. The sleeves slide in the standards 45 and are connected, through the pitmen 46, with the cross-bar 47, adjustably carried by the rods 48, which are pivotally connected to the cam-levers 49. These levers are pivoted to the frame at 50, while their other ends carry rollers 51, bearing on cams 52 of a cam-shaft 53, journaled in the head-frame 54. The drills are raised and lowered to their work by their cam mechanism. On the cam-shaft 53 eccentrics 55 56 are fixed, the straps of which are connected, respectively, with the clutch-controlling pins 34 and 36. These pins slide through bearings $34^\times$ $36^\times$.

I have shown in Fig. 3 the several positions of the pitman controlling the inclination of the chuck. Supposing the machine has just started and the clutch-lever is moving from the stop-pin 35 to the pin 34, during this moving the clutch-ring will engage the disk, the crank-shaft 12 will be turned, as well as the shaft 16, and the crank-pin will move from the position $21^\times$ to the position $22^\times$. This will swing the pendulum, with the chuck, outward beyond the proper point; but it will be returned as the position $22^\times$ is reached, so that it will occupy the proper inclined position, as shown in Fig. 4, for receiving the first drilling action for a spoke-hole, and when the stop-pin 34 is struck by the clutch-lever the clutch will be released and the chuck will remain stationary, whereupon the spindle will descend and perform the drilling and countersinking and recede. The continued movement of the cam-shaft will now retract the pin 34, thus releasing the clutch-lever and allowing the spring 29 to grip the friction-ring to the disk, and the clutch will continue its rotation until arrested by the pin 36, which has been meanwhile thrust out into the path of the lever by its eccentric. While the clutch is moving from pin 34 to pin 36, the pendulum-crank and pitman are moving from point $22^\times$ to point $23^\times$ and the bottom of the pendulum is moved from 22′ to 23′, giving the pendulum, with the chuck, an inclination opposite to the first one for the next pair of spoke-holes. As soon as these holes are drilled the cam-shaft, through the eccentric, retracts the pin 36, and the chuck-moving connections are thus set in motion by the release of the clutch, and the movement continues until the pin 34 is reached, thus returning the chuck, with the rim, to its former inclination. The stop-pin 35 is retained retracted by the pattern mechanism hereinafter described, and the clutch-lever can thus pass freely by it until the rim is completely drilled.

While the friction-clutch is moving from the pin 34 to the pin 36, carrying the pitman from $22^\times$ to $23^\times$, the gearing will turn the rim the distance of one hole. When the friction-clutch continues this movement in the direction of the arrow from pin 36 to pin 34, the gearing will move the rim a space equal to three holes, one drill passing over two drill-holes before it again pierces the rim.

A diagram of the order of drilling is shown in Fig. 11.

C is the first drilling position after the rim starts, the spindle coming down and drilling the holes A A. D is the second position. The rim has revolved from point A to B. The next two holes drilled are B B. Position F is the third position. In this it will be noticed that the new holes drilled are C C, the rim having revolved from the point C around to the point B. In the second position the rim only revolves from the point B to the point A, the position at F corresponding with the position at C and the line C C with the lines A A. E is the final position, the last holes that were drilled being X X. After drilling these the spindles rise, the friction-clutch revolves from the pin 36 down to the pin 35, with which it comes in contact, stopping the pendulum pitman-rod in the position $21^\times$, which causes the rim to stop in line with the spindles or perpendicular to the floor, so that the new rim which is placed on the chuck will be in position for receiving the valve-hole drill at right angles to the axis of the rim.

The machine is driven from a main shaft 57, journaled in a bracket 58 and belted, through the pulley 59 and belt 60, to a shaft 61, the hanger or bearing-sleeve 62 of which is pivoted to the machine-standard at 63. This shaft carries a worm 64 to mesh with a worm-wheel 65 on a shaft 66, extending from the inside of the standard through bearings in a bracket 67 on the outer side of said standard. An inclined shaft 68 transmits, through beveled gears 69 70, the movement of the worm-shaft to the cam-shaft. The main shaft also carries a pulley 71, from which a belt 72 extends to a pulley 73 on a short shaft 74, having a pinion 75, meshing with a gear 76 on the shaft 28, which shaft carries the friction-disk which controls the movements of the chuck.

In starting the machine the operator presses down the foot-lever 78, which raises the tilting shaft 61, so that its worm-gear will engage the worm on the shaft 66, and thus the cam-shaft which controls the spindles and the clutch-releasing pins 34 and 36 will be operated. Simultaneously with this engagement of the worm-gear and worm the stop-pin 35 will be retracted to release the friction-clutch lever and to thus connect the chuck-controlling mechanism with the shaft 28. This retraction of the stop-pin is effected through a rod 79, connected to the foot-lever, a lever 80, and a link 81, connected to the stop-pin. The stop-pin is retained in this retracted position by a pivoted locking-plate 82, and the tilting shaft is held up by a latch 83. This latch therefore holds the worm-gearing in mesh, so that the cam-shaft will continue to revolve, operating the drill-spindles and controlling the action of the chuck-operating devices through the pins 34 and 36 and the clutch until the rim is entirely drilled and the machine is to be stopped. For this stopping I employ a stop or pattern mechanism consisting of a toothed wheel 84, journaled at the side of the frame and having a pin 85 to turn a lever 86 on its pivot, and thus operate the rods 87 88, the rod 87 being connected to the latch 83, which holds the worm-gearing in mesh, while the rod 88 is connected with the pivoted latch or locking-plate 82, which holds the stop-pin, and when these latches are drawn upon the worm-gearing is thrown out of gear, thus stopping the cam-shaft and the drills, and the stop-pin 35 is released, so as to project, under the action of its spring $35^\times$, into the path of the clutch-lever to release the friction-clutch. The toothed wheel 84 is moved step by step, corresponding to the movements of the chuck, by a pawl $84^\times$ on an arm 89, secured to one of the horizontal spindles 6 of the pendulum 3, so that each time the pendulum oscillates the pattern-wheel will be turned one step. There are a series of rows of teeth on the pattern-wheel, or, in other words, there are several pattern-wheels secured together to move as one, the pin 85 serving for the series, and the arm 89 has a pawl for each set of teeth. The several series of teeth differ in number in order to adapt the machine for different sizes of rims. In starting the machine the operator by pressing upon the foot-lever engages the worm-gearing, which is then held in mesh by the latch, and by the same action of the foot-lever the stop-pin 35 is withdrawn to allow the clutch to close, and thus move the rim-chuck.

The pitman 10 is connected with the pendulum and with the crank 11 by having its ends forked and pivoted to collars 90, which are loose on the bolts 91, carried by the crank and pendulum, respectively.

The universal joint 17, Fig. 12, above described, comprises a sleeve 92, connected by a pivot-block 95 with the shaft 16, said sleeve having a plunger 94 sliding within it, which is connected by the pivot-block 95' with the shaft-section 18, which carries the chuck-gear 19. This connection allows the necessary movement to the gear 19 to accommodate the swinging of the chuck.

The drill-spindles are returned to normal position by springs 96, secured at one end to the sleeves 44 and at their other ends to adjustable bolts 97, threaded through the standards 45. The cam-levers are kept in contact with their cams by suitable springs (not shown) bearing on the cam-levers.

The sleeve 44 is made in sections, with an interposed spring 38', to allow for any variations in the thickness or inequalities of the rim. This spring may be arranged at any point between the drills and the cams to compensate for variations.

The countersink is shown at 99, and a countersink-stop at 100, connected to the sleeve 44 at 102 by the rod $102^\times$.

The pendulum is adjustable up and down for different diameters or rims or for different kinds of drilling. It will be noticed that the pivots of the pendulum are in the same vertical and horizontal plane with the drilling-point, so that the chuck, with the rim, may be oscillated, but the drilling-point will be in the center of the rim. If, however, the chuck is adjusted to raise the rim above or lower it below the center of oscillation, the holes will be drilled either on one side or the other of the center, the holes thus being "staggered," and the rim may be raised so high that the holes will come in the center of the rim on the inside.

For the vertical adjustment of the chuck with the rim a screw 103 passes through an ear 104 on the pendulum to engage the arm 23, which, as before set forth, carries the chuck-gear and pinion 20 21. This arm 23 carries the shaft 2 of the chuck, which shaft passes through a slot in the pendulum, so that by moving the screw the arm will be moved, carrying with it the chuck and the gear 20 and pinion 21, which latter engages the gear 22 on the chuck. In this vertical movement it is necessary that the gear 20, with its pinion 21, shift laterally in order to maintain connection with the gears 19 and 22, respectively, and for this purpose the pendulum has an inclined slot at 106 and the arm 23 has a lateral extension, with a curved slot therein at 107, a clamping-bolt 107' passing through the two slots, so that the gear may be adjusted to mesh whatever the adjustment of the chuck may be.

The spindles are driven by the belt 108, which passes from the pulley 109 on the main shaft over the guide-pulleys 110, about the pulleys on the spindles, and about an idler 110'. The center spindle is driven from the belt 112 from the pulley 113, which is fixed to the hub of the idler 110'.

The center spindle for drilling the valve-hole is depressed to its work by a handle 114, and this is done while the chuck is vertical.

In changing from one spacing to another it is necessary to change the intermediate gear 20 and its pinion 21 and to throw in the proper pawl of the stop-motion to engage the proper series of teeth. The spindles would also have to be adjusted toward or from each other.

In order to prevent all tendency or possibility of the shaft 16 being turned in the opposite direction from which it is running when it strikes either of the pins 34 36, which might be caused by the spring-pressure of the lever 31, I have provided on the disk 24 the two projections $a\, b$, one being in advance of and the other in rear of the clutch-lever 31, so that when the lever 31 strikes the pin 36 the stud $b$ will present its ratchet-face to the series of pawls $c\, c'\, c''\, c'''$, pivoted to the frame and pressed upon by the spring-fingers $c^4$ of the spring $c^5$, and these pawls, or one of them, will hold the plate 24, with the shaft 16, against retracting movement, thus accurately positioning the chuck. The four pawls are provided, so that one of them will surely drop into a tooth to hold the disk and shaft. The toothed faces of the projections are broad to receive the four pawls, and these faces consist of steel plates placed on the projections. When the clutch-lever strikes the pin 34, the projection $a$, which lies in advance of the clutch-lever, will be engaged by the pawls. The pawl and ratchet prevent inaccurate spacing and prevent wear on the friction parts of the clutch. When the toggle-joint lever strikes the stop-pins, the momentum of the moving parts carries it farther than it would be carried simply by the friction contact, so that by interposing the pawl and ratchet and preventing it from moving back it is locked in the open position and leaves the friction-ring perfectly free on the disk, thus preventing wear.

I claim—

1. A drilling-machine for bicycle-rims and the like comprising the rotary drills with driving means therefor, a rotary chuck adapted to oscillate for inclining the rim, and automatic means for reciprocating the drills and for rotating and changing the inclination of the chuck between the drilling actions, substantially as described.

2. A drilling-machine comprising the rotary drills with driving means therefor, an oscillating pendulum, a chuck carried thereby, automatic means for oscillating the pendulum, and automatic means for rotating the chuck between the drilling actions, substantially as described.

3. A drilling-machine comprising the rotary drills with driving means therefor, an oscillating pendulum, a rotary chuck carried thereby, automatic means for oscillating the pendulum, and automatic means for simultaneously rotating the chuck, substantially as described.

4. A drilling-machine comprising the rotary drills with driving means therefor, an oscillating pendulum, a rotary chuck carried thereby, means for oscillating the pendulum and rotating the chuck automatically, and controlling means whereby the oscillating movements and the rotary movements are intermittent, substantially as described.

5. In combination the drill with means for rotating and reciprocating the same, a chuck with automatic means for rotating the same and for giving it different inclinations and controlling means whereby the movements of the chuck are intermittent, substantially as described.

6. In combination, the drill, means for rotating the same, the chuck, and the pivoted pendulum carrying the same, said pendulum having the axis of its pivot substantially in line with the drilling-point, substantially as described.

7. In combination, the drill, means for rotating the same, the chuck, the pendulum carrying the same, and the horizontal pivots for the pendulum, said pivots being substantially in the same plane vertically and horizontally with the drilling-point, substantially as described.

8. In combination, the drill with means for rotating the same, the rotary chuck, the pivoted pendulum carrying the same, means for oscillating the pendulum, the gearing for rotating the chuck, and the shaft for driving the gearing having a universal joint to allow for the different positions of the gearing, substantially as described.

9. In combination, the drill with means for rotating the same, the chuck, the pivoted pendulum carrying said chuck, the gearing for rotating the chuck, the shaft connected with the gearing, the shaft 12 geared to the said shaft the crank on the shaft 12, and the pitman between the crank and the pendulum, substantially as described.

10. In combination, the drill with means for rotating the same, the chuck, the pivoted pendulum carrying the same, gearing for rotating the chuck with operating means therefor, and a pitman for inclining the chuck with operating means therefor, substantially as described.

11. In combination, the drill with means for rotating the same, the chuck, the pivoted pendulum carrying the same, gearing for rotating the chuck, connections for swinging the pendulum, the shaft for operating said connections and the gearing, and a clutch controlling said shaft with means for setting or releasing said clutch, substantially as described.

12. In combination, the drill with driving means therefor, the rotary chuck, the pendulum carrying the same, the shaft connected to both the gearing and the pendulum, the clutch for controlling the shaft 16, the pin for controlling the clutch with means for operating the pin, substantially as described.

13. In combination, the drill with driving means therefor, the rotary chuck, the pendulum carrying the same, the shaft connected to both the gearing and the pendulum, the clutch controlling the said shaft, the means for reciprocating the drills to and from their work, and the clutch-controlling devices operated by said means, substantially as described.

14. In combination, the drill with driving means, the rotary chuck, the swinging pendulum carrying the same, the shaft with connections to the chuck and to the pendulum for operating the same, the friction-clutch on the shaft, the pin controlling said clutch, the cam-shaft, connections therefrom for operating the drills, and the eccentric on the cam-shaft for controlling the pin, substantially as described.

15. In combination, the chuck, means for oscillating the chuck, and means for rotating the same intermittingly, the drill and means for automatically reciprocating the drill between the movements of the chuck, substantially as described.

16. In combination, the chuck, the drill-spindle with operating means, the drill-standard, the sleeve within the same, the ball-bearing head between the sleeve and the spindle and means for moving the sleeve, substantially as described.

17. In combination, the drill with its spindle, the yielding sleeve, the countersink, the countersink-stop, said stop reciprocating with the drill, and the rod 102$^\times$ connecting the stop with the upper part of the sleeve, substantially as described.

18. In combination, the drill with its spindle, the countersink, the countersink-stop, the drill-standard, the sleeve within the same for reciprocating the drill, and the connection between the countersink-stop and the sleeve, substantially as described.

19. In combination the frame, the chuck, the drill for making the spoke-hole, automatic means for operating the drill and the chuck, and a valve-hole drill supported by the frame to be operated by hand, substantially as described.

20. In combination with a pair of drills with driving means, a rotary chuck means for rotating the same step by step, and controlling means for varying the amount of movement one step being longer than the other, substantially as described.

21. In combination with a pair of drills having operating means therefor, a rotary chuck, means for rotating the same including a shaft connected thereto, a clutch for said shaft, and a pair of stop-pins for controlling the clutch with means for operating the stop-pins, substantially as described.

22. In combination with a pair of drills and their operating means, a rotary chuck, means for rotating the same including a shaft connected thereto, a clutch for said shaft and a pair of stop-pins for controlling the clutch with means operating the stop-pins, said stop-pins being at unequal distances apart measured around the circumference of the clutch, substantially as described.

23. In combination, with the drill and its operating means, a chuck with means for rotating the same and inclining the same, a clutch controlling said means, a pin with operating mechanism controlling said clutch to render the action of the chuck intermittent and a stop-pin for stopping the movements of the chuck when the rim is bored, substantially as described.

24. In combination, the drill and its operating means, the pendulum, the chuck carried thereby, and the stop motion with a connection to the pendulum to be operated thereby, substantially as described.

25. In combination the drill and its operating means, the pendulum, the chuck carried thereby, means for operating the chuck and pendulum, means for reciprocating the drills, a clutch and stop-pin for the chuck-operating means, a latch for said stop-pin, a catch controlling the drill connections and a stop-motion connected to the latch and to the catch, substantially as described.

26. In combination the reciprocating drill with means for rotating it, the disengaging-gear having connections thereto for operating the drill, the rotary chuck, the swinging pendulum, the operating connections for the chuck and pendulum, the controlling-clutch the stop-pin, and the lever for retracting the stop-pin and for throwing the gearing into mesh, substantially as described.

27. In combination the drill, operating means therefor, the chuck, the swinging pendulum, the operating mechanism for said parts, and the stop-motion comprising the ratchet-wheel, the connections to be operated thereby and the pawl with its pawl-arm connected to the pendulum, substantially as described.

28. In combination, the drill, operating means therefor the chuck, the pendulum carrying the same and pivoted substantially in line with the drilling-point, and means for raising and lowering the chuck so that the center of the rim will be above or below the pivots to secure staggered drilling, substantially as described.

29. In combination, the drill, operating means therefor, the chuck, the gearing for rotating the chuck, the pendulum carrying the said chuck, means for adjusting the chuck thereon, and a laterally-adjustable arm moving with the chuck and carrying a portion of the gearing, substantially as described.

30. In combination, the drill, the chuck with means for oscillating the same, the gear 22, the gear in connection therewith, and the flexible shaft independent of the chuck-shaft for rotating said gear, substantially as described.

31. In combination, the drill, the rotary chuck, the gear 22, the pendulum pivoted at or near the top of the chuck, and the gearing for rotating the chuck meshing with the gear 22 near the top of the chuck, substantially as described.

32. In combination, the drills, the chuck with operating connections for inclining and rotating the chuck, the clutch for controlling the movement or release of the operating connections and means to hold the connections against undue movement when the clutch devices are operated, substantially as described.

33. In combination, the drills, the clutch with operating connections thereto including a shaft 16, the shaft 28, the clutch between them, means for releasing the clutch and detent means for holding the shaft 16 against retracting movement when the clutch is released, substantially as described.

34. In combination, the drills, the clutch, the shaft 16 having connections to the chuck, the clutch comprising the clutch-ring, the disk 24 on the shaft 16, the lever 31 for releasing the clutch-ring also carried by the disk 24, the pin for operating the clutch-lever, the projection $a$ on the disk 24 and the series of pawls to engage the teeth in said projection, substantially as described.

35. In combination, the drills, the clutch, the shaft 16 having connections to the chuck, the clutch comprising the clutch-ring, the disk 24 on the shaft 16, the lever 31 for releasing the clutch-ring also carried by the disk 24, the pin for operating the clutch-lever, the projection $a$ on the disk 24 and the pawl, and to engage the teeth on said projection, substantially as described.

In testimony whereof I affix my signature in presence of two witnesses.

WILLIAM R. FOX.

Witnesses:
JNO. DUFFY,
ELIZABETH JONES.